US011364534B2

(12) United States Patent
Wagner et al.

(10) Patent No.: US 11,364,534 B2
(45) Date of Patent: Jun. 21, 2022

(54) METHOD FOR FIXING A PLURALITY OF WORKPIECES VIA A RIVET ELEMENT

(71) Applicant: Bayerische Motoren Werke Aktiengesellschaft, Munich (DE)

(72) Inventors: Julia Wagner, Garching (DE); Maximilian Wilhelm, Bockhorn (DE); Stephan Lehner, Gebelkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/342,227

(22) Filed: Nov. 3, 2016

(65) Prior Publication Data
US 2017/0066042 A1 Mar. 9, 2017

Related U.S. Application Data

(63) Continuation of application No. PCT/EP2015/055415, filed on Mar. 16, 2015.

(30) Foreign Application Priority Data

May 7, 2014 (DE) ...................... 10 2014 208 513.6

(51) Int. Cl.
*B21J 15/06* (2006.01)
*B21J 15/50* (2006.01)
*F16B 19/12* (2006.01)

(52) U.S. Cl.
CPC ............... *B21J 15/06* (2013.01); *B21J 15/50* (2013.01); *F16B 19/12* (2013.01)

(58) Field of Classification Search
CPC ... B21J 15/04; B21J 15/06; B21J 15/08; B21J 15/50; F16B 19/12
(Continued)

(56) References Cited

U.S. PATENT DOCUMENTS 1,382,906 A * 6/1921 Gravell ................... F16B 19/12
411/504
2,342,732 A * 2/1944 Gudmundsen ........... B21J 15/06
29/512
(Continued)

FOREIGN PATENT DOCUMENTS

CN 1955497 A 5/2007
CN 102756067 A 10/2012
(Continued)

OTHER PUBLICATIONS

Chinese-language Office Action issued in counterpart Chinese Application No. 201580005003.7 dated Dec. 4, 2017 with partial English translation (Seven (7) pages).
(Continued)

*Primary Examiner* — Jacob J Cigna
*Assistant Examiner* — Michael W Hotchkiss
(74) *Attorney, Agent, or Firm* — Crowell & Moring LLP

(57) ABSTRACT

A method for fixing a plurality of workpieces via a hollow rivet element with an open setting end and a closed closing end. The method includes passing the rivet element through mutually aligned openings of the workpieces. The method also includes introducing a fluid, in particular air, under high pressure from the setting end of the rivet element in a hollow space of the rivet element. The method also includes plastically deforming and setting of the rivet element by the fluid at the closed closing end of the rivet element.

10 Claims, 2 Drawing Sheets

(58) Field of Classification Search
USPC .......................................................... 411/19
See application file for complete search history.

(56) References Cited

U.S. PATENT DOCUMENTS

| | | | | | |
|---|---|---|---|---|---|
| 2,359,629 | A | * | 10/1944 | Dexter | B21J 15/06 29/523 |
| 2,387,692 | A | * | 10/1945 | Sundstrom | B05B 7/1666 29/505 |
| 2,415,560 | A | * | 2/1947 | Higley | F16B 19/12 411/19 |
| 2,436,185 | A | * | 2/1948 | Torresen | B21K 1/60 411/19 |
| 2,438,976 | A | * | 4/1948 | Lautmann | F16B 19/12 411/19 |
| 2,445,803 | A | * | 7/1948 | Rogers | F16B 19/12 29/421.1 |
| 2,492,590 | A | * | 12/1949 | Nofzinger | B21J 15/06 411/19 |
| 2,492,605 | A | * | 12/1949 | Varney | F16B 19/12 411/19 |
| 2,526,955 | A | * | 10/1950 | Kugler | B21J 15/043 30/94 |
| 2,535,079 | A | * | 12/1950 | Lebert | B21J 15/06 72/54 |
| 2,543,063 | A | * | 2/1951 | Rogers | B21K 1/60 29/421.1 |
| 2,562,721 | A | * | 7/1951 | Jakosky | B21J 15/06 29/523 |
| 2,562,724 | A | * | 7/1951 | Lebert | F16B 19/12 29/509 |
| 2,717,440 | A | * | 9/1955 | Anacker | B21J 15/50 30/95 |
| 3,213,743 | A | * | 10/1965 | Campbell | F16B 19/12 411/19 |
| 3,257,890 | A | * | 6/1966 | Kraemer | F16B 19/1054 411/43 |
| 3,438,302 | A | * | 4/1969 | Sandor | F16B 19/1081 411/80.2 |
| 3,789,728 | A | * | 2/1974 | Shackelford | F16B 37/067 411/34 |
| 5,354,160 | A | * | 10/1994 | Pratt | B21J 15/00 29/243.521 |
| 6,301,766 | B1 | * | 10/2001 | Kolle | B21C 23/007 29/421.1 |
| 7,008,157 | B2 | * | 3/2006 | O'Banion | F16B 19/12 411/19 |
| 2007/0068116 | A1 | * | 3/2007 | Droulez | F16B 5/04 52/782.1 |
| 2008/0156941 | A1 | * | 7/2008 | Liu | B21J 15/142 244/35 R |
| 2012/0210557 | A1 | * | 8/2012 | Jones | B21J 15/043 29/525.06 |

FOREIGN PATENT DOCUMENTS

| | | | |
|---|---|---|---|
| CN | 202811735 U | 3/2013 | |
| DE | 689 584 | 3/1940 | |
| FR | 2 713 724 A1 | 6/1995 | |
| FR | 2 713 724 B1 | 1/1996 | |
| GB | 567664 A * | 2/1945 | ............. F16B 19/12 |
| GB | 567664 A * | 2/1945 | ............. F16B 19/12 |
| JP | 7-110020 A | 4/1995 | |
| WO | WO 02/090041 A1 | 11/2002 | |

OTHER PUBLICATIONS

Chinese Office Action issued in counterpart Chinese Application No. 201580005003.7 dated Mar. 16, 2017 with English-language translation (twenty (20) pages).
International Search Report (PCT/ISA/210) issued in PCT Application No. PCT/EP2015/055415 dated May 29, 2015, with English translation (six (6) pages).
German-language Written Opinion (PCT/ISA/237) issued in PCT Application No. PCT/EP2015/055415 dated May 29, 2015 (six (6) pages).
German Search Report issued in counterpart German Application No. 10 2014 208 513.6 dated Jan. 7, 2015, with partial English translation (fifteen (15) pages).

* cited by examiner

METHOD FOR FIXING A PLURALITY OF WORKPIECES VIA A RIVET ELEMENT

CROSS REFERENCE TO RELATED APPLICATIONS

This application is a continuation of PCT International Application No. PCT/EP2015/055415, filed Mar. 16, 2015, which claims priority under 35 U.S.C. § 119 from German Patent Application No. 10 2014 208 513.6, filed May 7, 2014, the entire disclosures of which are herein expressly incorporated by reference.

BACKGROUND AND SUMMARY OF THE INVENTION

The embodiments of the invention relate to a method for fixing a plurality of work pieces by means of a hollow rivet element.

A rivet connection is an old and dependable method for connecting a plurality of work pieces. Blind rivets are known for situations where the connecting location can be accessed only from one side. With blind rivets, a rivet mandrel is pulled after the rivet has been introduced into the fixing openings of the work pieces to be connected, so that the rivet is plastically deformed on the backside of the work pieces, which is not accessible, and permanently connects the work pieces. After the connection has been established, the rivet mandrel tears off.

Blind rivets require a high production effort and therefore have a relatively high unit cost compared to other rivets. Furthermore, a subsequent tightening of the connection is no longer possible.

Accordingly, an object of the embodiments of the invention is to provide an economical method for fixing a plurality of work pieces.

This and other objects of the invention are achieved by a method for fixing a plurality of work pieces by means of a hollow rivet element with an open setting end and a closed closing end, including the following steps:

Leading the rivet element through mutually aligning openings of the work pieces, Introducing a fluid, in particular air, under high pressure from the setting end of the rivet element into a hollow space of the rivet element, and Plastically deforming and setting of the rivet element by the fluid at the closed closing end of the rivet element.

The embodiment makes it possible to use the rivet element in a simple fashion to affix a plurality of work pieces. In particular, no complex structures are required at the actual rivet element, which leads to a drastic reduction in unit prices.

For example, the rivet element and/or the fluid are heated before the fluid is introduced, which means that the pressure required for the deformation of the fluid can be reduced to further lower the cost of the process.

Preferably, the fluid is removed from the hollow space or escapes from the hollow space after the desired deformation of the rivet element has been achieved. In this way, it is possible to connect even fluid-sensitive work pieces by means of the method according to the invention.

In one embodiment of the invention, the pressure and/or the temperature of the fluid is adapted to the desired clamping length of the rivet element, which means that the clamping length of the rivet element can be determined by the selection of the pressure and/or the temperature. In this way, it is possible to use rivet elements of identical structure for various connections, which leads to a further lowering of the unit cost of the rivet elements.

In one design variant of the invention, fluid is introduced again into the hollow space of the rivet element after the deformation of the rivet element, which ensures that the rivet element has deformed as desired.

Preferably, when the fluid is introduced again, a higher pressure is used than in the previous introduction, which tightens the connection of the work pieces. In this way, a subsequent tightening of the connection is facilitated in a simple fashion.

In one design variant, a rivet element with a hollow, cylinder-shaped bushing is used, which has a setting end, a closing end and a shaft that extends between the setting end and the closing end, as well as a collar that is arranged at the setting end on the bushing, with the bushing being open at the setting end and closed at the closing end, with the shaft and/or the closing end having at least one form section which, compared to other sections of the shaft and/or the closing end, has a different deformability. By developing a form section with a changed deformability, it is possible to influence the form of the closing end after the plastic deformation in a simple manner.

The form section may be developed by at least one section having a wall strength that differs from the wall strength of the shaft and/or the closing end outside of the form section, so that developing the form section can be realized in a simple and economical fashion.

For example, the form section may be developed by weakening the shaft and/or the closing end, in particular by a notch, which facilitates a simple and economical option for developing a form section.

The collar and the bushing can be designed in one piece, which further lowers the production costs of the rivet element.

In one embodiment of the invention, the fluid is introduced again at high pressure into the hollow space of the rivet element in order to disengage the rivet connection, with the pressure being selected high enough for the plastically deformed closing end of the rivet element to tear off. In this way, it is possible to disengage the connection of the plurality of work pieces with the same tool that was also used to connect the work pieces.

Other characteristics and advantages of the embodiments of the invention follow from the description below as well as from the attached illustrations to which reference is made.

Other objects, advantages and novel features of the embodiments of the present invention will become apparent from the following detailed description of one or more preferred embodiments when considered in conjunction with the accompanying drawings.

DETAILED DESCRIPTION OF THE DRAWINGS

Figure 1:
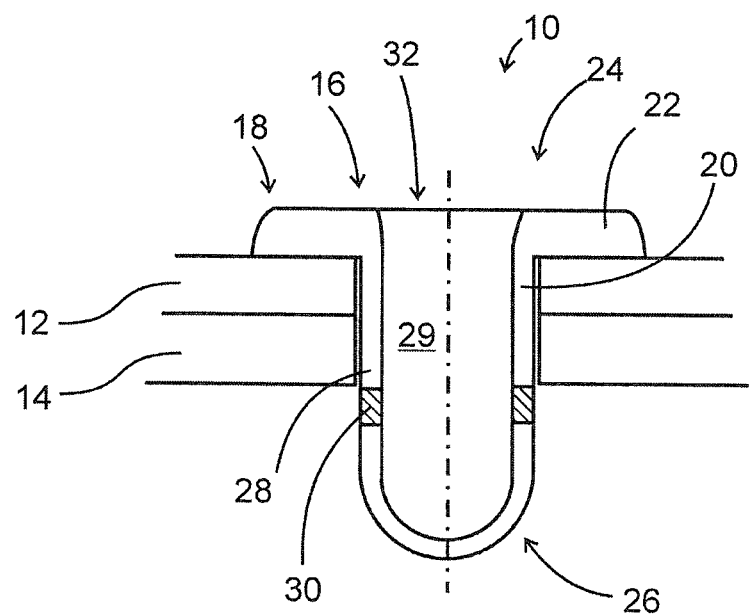
FIG. 1 illustrates a rivet element for connecting a plurality of work pieces according to step a) of a method according to an embodiment of the invention.

FIG. 1 shows a connecting location 10 between two work pieces 12, 14 in section. The work pieces 12, 14 each have mutually aligning opening 16 through which a rivet element 18 extends.

The rivet element 18 has a cylinder-shaped bushing 20 and a collar 22, and it can be made of a metal or a plastic.

For example, the cylinder-shaped bushing 20 has a circular cylinder shape and a setting end 24 and a closing end 26, between which a shaft 28 extends.

The bushing 20 is designed hollow, with it being open at the setting end 24 and closed at the closing end 26 so that the rivet element 18 forms a hollow space 29 that is open at one end.

The shaft 28 can have a form section 30 that completely extends in the direction of the circumference about the bushing 20.

Compared to other sections of the shaft 28, the form section 30 has a different deformability. For example, the deformability in the form section 30 is greater relative to the deformability of the remaining shaft 28.

The different deformability of the form section 30 can be developed by a section having a wall strength that is different than the wall strength of the shaft 28 outside the form section 30.

Furthermore, the form section 30 can be formed by a weakening of the shaft 28, in particular by notches.

It goes without saying that the form section 30 can be provided at the closing end 26 of the bushing 20, with the aforementioned statement applying correspondingly to the closing end 26. For example, the deformability of the form section is then different than the deformability of the remaining closing end 26.

Of course, it is also conceivable that the form section 30 does not extend fully about the circumference of the bushing 20, but rather only in sections in the direction of the circumference.

The form section 30 can also be formed by a section that has a hardening that differs from the hardening of the shaft 28 or the closing end 26.

The collar 22 is arranged at the setting end 24 of the bushing 20 and can be developed in one piece with the bushing 20.

The opening of the bushing 20 at the setting end 24 forms a blow-in mouth 32 at which a nozzle 34 of a connecting tool (not shown) can be placed tightly.

To connect the work pieces 12, 14, a fluid, such as air, for example, is introduced into the hollow space 29 at high pressure after the rivet element 18 was inserted into the opening 16, as shown in FIG. 1.

Figure 2:
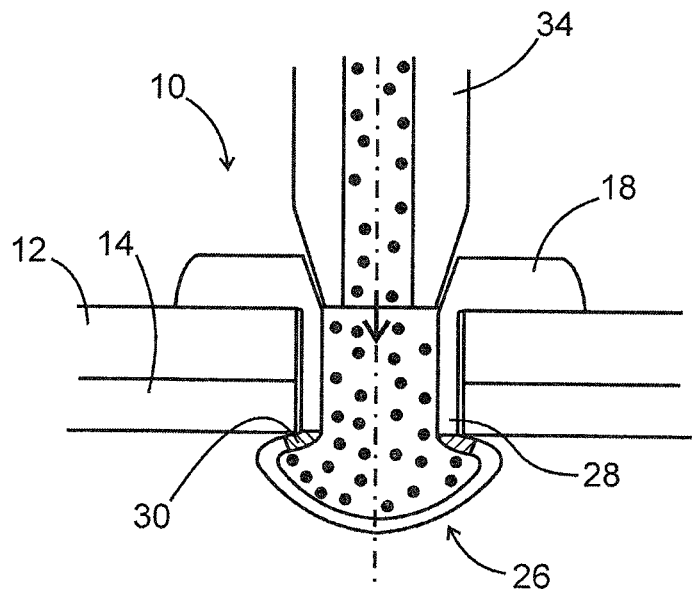
FIG. 2 illustrates the rivet element according to FIG. 1 in the performance of the steps b) and c) of the method according to the embodiment of the invention.

To that end, as shown in FIG. 2, the nozzle 34 of the connecting tool is introduced into the blow-in mouth 32 so that the hollow space 29 is completely closed.

As indicated by the dots in the figures, a fluid is then pressed into the hollow space 29 at a high pressure.

The bushing 20 of the rivet element 18, in particular the closing end 26, is plastically deformed by the pressure of the fluid and the rivet element 18 is set. The closing end 26 takes the form of a mushroom, for example.

In the deformation, the closing end 26 and the part of the shaft 28 that protrudes from the work piece 14 is widened such that they form an undercut that abuts the work piece 14.

The deformation and shape of the undercut can be influenced by the type and/or the geometry of the form section 30.

In the shown embodiment, the form section 30 is more easily deformable than the remaining sections of the shaft 28 so that the shaft 28 deforms and widens in the region of the form section 30.

To achieve a better deformability of the rivet element 18, the rivet element 18 can be heated before introducing the fluid.

The fluid itself can also be heated prior to the introduction.

It is also conceivable to adapt the pressure and/or the temperature of the fluid to the desired clamping length of the rivet element. That is because the pressure and/or the temperature of the fluid can also be used to influence the deformation of the rivet element 18. For example, a high pressure leads to a nearly complete spherical deformation of the closing end 26.

After the desired deformation of the rivet element 18 has been achieved, the nozzle 34 is removed from the rivet element 18 and the fluid can escape from the hollow space 29.

It is also conceivable to remove the fluid from the hollow space 29 via the nozzle 34, for example by generating a negative pressure.

Figure 3:
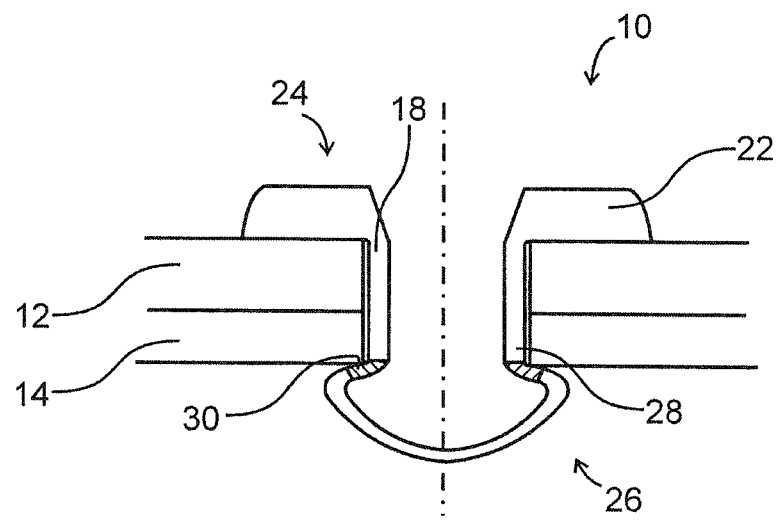
FIG. 3 illustrates the rivet element according to FIG. 1 after the performance of the method according to the embodiment of the invention.

The two work pieces 12, 14 are now firmly connected to each other by the rivet element 18, as is shown in FIG. 3.

To ensure the safe connection of the work pieces 12, 14 by the rivet element 18, fluid can again be introduced into the hollow space 29 of the rivet element, which is to say the aforementioned process can be repeated.

It is also possible to tighten the connection between the two work pieces 12, 14 subsequently, for example after half of the designated service life of the work pieces 12, 14 has passed. To that end, the aforementioned process can be repeated, but in doing so, the fluid is pressed into the hollow space 29 of the rivet element 18 at a higher pressure than with the previous, first introduction, to again press the work pieces 12, 14 against each other.

Figure 4:
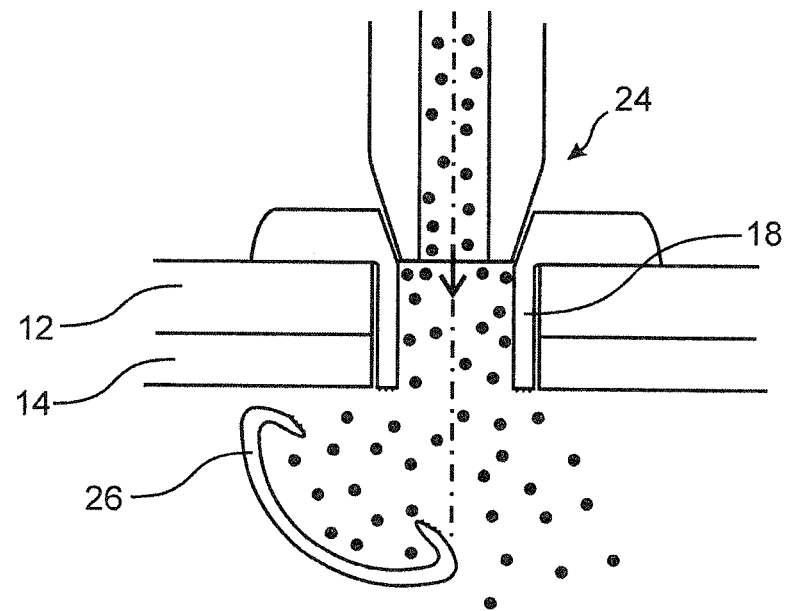
FIG. 4 illustrates the rivet element according to FIG. 1 after it was disengaged according to the embodiment of the invention.

It is also possible to disengage the connection between the two work pieces 12, 14 generated by the rivet element 18, for example if one of the two work pieces 12, 14 is to be replaced. To that end, as shown in FIG. 4, the nozzle 34 is again placed at the blow-in mouth 32 and fluid is again introduced into the hollow space 29 of the rivet element 18. However, in this case, the pressure of the fluid is selected high enough that the closing end 26 of the rivet element tears off, which causes the undercut generated in the deformation to tear off as well. In this way, the remaining part of the rivet element 18 can then be removed again from the opening 16 and the two work pieces 12, 14 can be separated from each other.

To that end, the form section 30 can serve as the intended tearing point if it is developed weak enough.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for fixing a plurality of workpieces with a riveting element that is hollow and has an open setting end and a closed closing end, the method comprising the steps of: passing the riveting element through openings in the workpieces; selecting a given pressure that will cause a given clamping length of the riveting element; introducing air, at the given pressure from the setting end of the riveting element into a cavity of the riveting element; plastically deforming and setting the riveting element by the air at the closed closing end of the riveting element; introducing the air at a pressure higher than the given pressure into the cavity of the riveting element, the higher pressure being a pressure that causes tightening of a connection of the workpieces, wherein a shank and/or the closing end have at least one forming portion which has a different deformability compared with other portions of the shank and/or of the closing end; and removing a portion of the rivet at an intended tear portion on the forming portion.

2. The method according claim 1, wherein in the step of passing the riveting element the workpieces are arranged to be flush with one another.

3. The method according to claim 1, wherein the riveting element and/or the air is heated prior to the step of introducing air at the given pressure.

4. The method according to claim 3, wherein once the given clamping length of the riveting element has been achieved, the air is removed or escapes from the cavity.

5. The method according to claim 4, wherein a temperature of the air is adapted to the given clamping length of the riveting element.

6. The method according to claim 5, wherein the riveting element has a hollow cylindrical sleeve, which has the setting end, the closing end and the shank which extends between the setting end and the closing end, and with a collar which is arranged on the setting end on the sleeve, the sleeve being open at the setting end and closed at the closing end.

7. The method according to claim 6, wherein the forming portion is formed by at least one portion which has a wall thickness which differs from a wall thickness of the shank and/or of the closing end outside the forming portion.

8. The method according to claim 7, wherein the forming portion is formed by weakening the shank and/or the closing end by notching.

9. The method according to claim 8, wherein the collar and the sleeve are embodied in one piece.

10. The method according to claim 9, wherein in order to release the connection of the workpieces, the air is again introduced into the cavity of the riveting element at a further pressure, the further pressure being a pressure that is sufficient to tear off the closing end of the riveting element.

\* \* \* \* \*